July 28, 1936.  E. BAUMGARTNER  2,049,103
CHANGE SPEED
Filed July 26, 1935
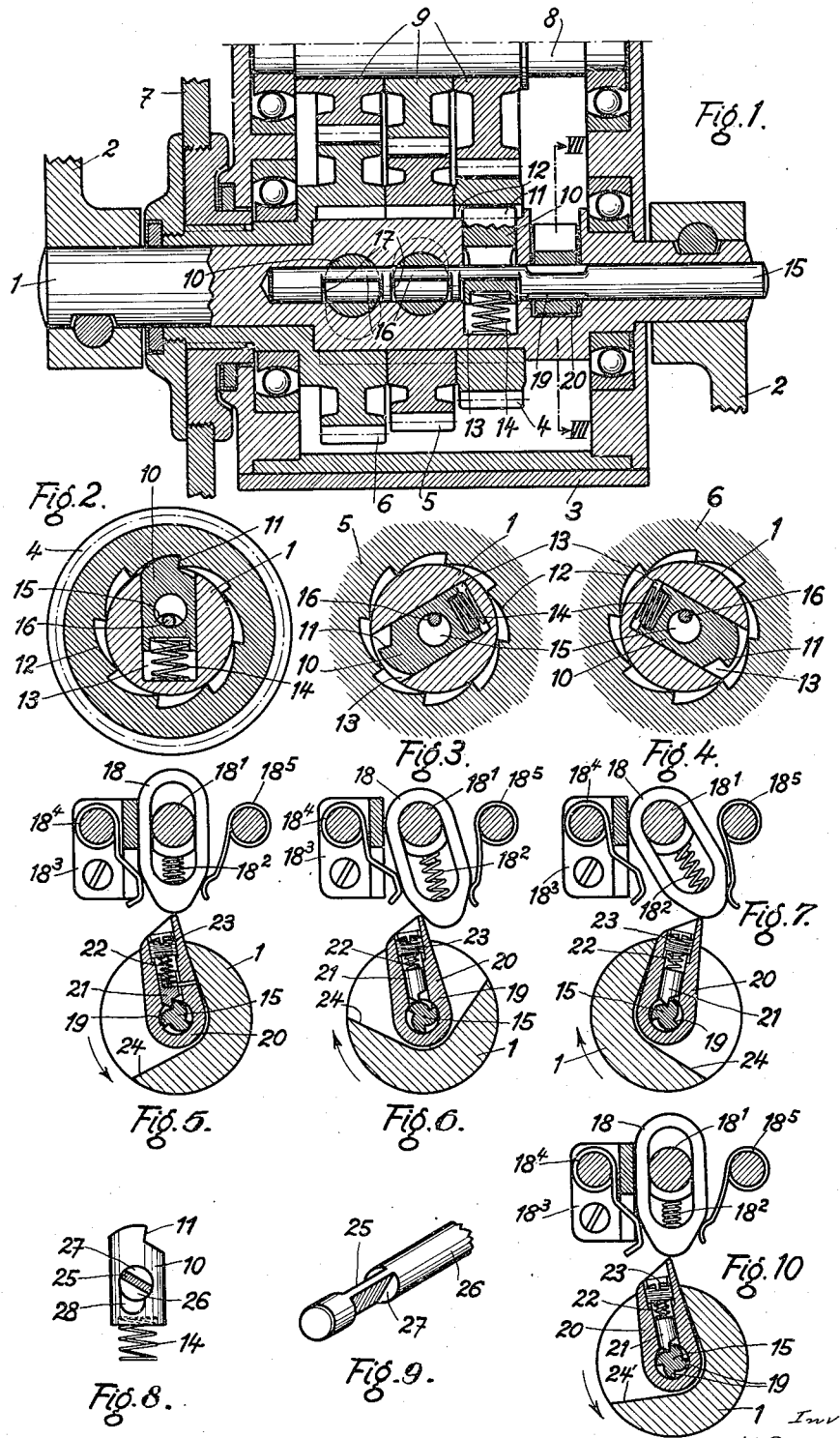

Patented July 28, 1936

2,049,103

UNITED STATES PATENT OFFICE 2,049,103

CHANGE SPEED

Emil Baumgartner, Bienne, Switzerland

Application July 26, 1935, Serial No. 33,400
In Switzerland March 30, 1935

2 Claims. (Cl. 74—363)

The present invention relates to a change speed for bicycles and is an improvement of the type where the change wheels are in constant mesh and being arranged loose on the pedal shaft are coupled singly to this shaft through unidirectional clutches between the pedal shaft and change wheels, said clutches comprising pawls held slidingly in the shaft and controlled by an axially arranged rotatable rod operated by a pawl device.

The invention consists in that this pawl arrangement comprises ratchet teeth provided on said rotatable rod and an arm pivotally held on said ratchet portion of the rod within a recess of the shaft, but engaged with said ratchet teeth by means of a resilient clutch tooth, said arm projecting with its free end to some extent over the surface of the shaft to meet and be turned by a resilient stop device when the pedal shaft is back pedalled.

The Figures 1 to 7 relate to a three speed change, while Figs. 8 to 10 relate to a two speed change.

Fig. 1 is a longitudinal section of the pedal shaft having the clutch of the first wheel on the right hand side engaged for the first speed.

Figs. 2 to 4 are cross sections of the pedal shaft showing the pawls in the three positions corresponding to the positions of the three wheels in Fig. 1 effected by the positions of the cams within the bores of said pawls.

Figs. 5 to 7 are cross sections of the pedal shaft showing three positions of the resilient stop device with its clutch passing from one ratchet tooth of the rotatable rod to another.

Figs. 8 and 9 show the form of cams on the rotatable rod for two speed change, and Fig. 10 shows the arrangement of ratchet teeth on the rotatable rod in the case of the two speed change gear.

Referring to Figs. 1 to 4 the driving or pedal shaft 1 with the pedals 2 is disposed eccentrically in a cylindrical casing 3 fitted into a bore of the cycle framing. On this shaft are mounted loose three pinions 4, 5 and 6 corresponding to three provided speeds transmitted to a sprocket wheel 7 by a counter-shaft 8 by means of gear wheels 9 fast to the latter shaft. The coupling between the pedal shaft and the pinions 4, 5 and 6 is obtained by a unidirectional clutch by means of pawls 10, one for each pinion and slidably held in the pedal shaft, each pawl engaging with a tooth 11 an inside ratchet gearing 12 of said pinions. The pawls 10 are held in bores 13 of the pedal shaft and rest on springs 14. Said three bores 13 are mutually staggered at angles of 180°. When the shaft 1 is back pedalled the pawls would be pushed back by compressing said springs. The coupling of the shaft with one of said pinions and the uncoupling are effected by a cam-rod 15 arranged axially in a bore of the shaft. The cams are formed by eccentric pins 16 connecting the lateral walls of recesses 17 made in the rod, one recess per pinion. In Fig. 2 the cam 16 has been turned into its upper position, so that the spring 14 could push its pawl 11 into engagement with the ratchet teeth of pinion 6, while in Figs. 3 and 4 the cams are in an intermediate position where they hold the springs 14 in a compressed state.

The ratchet gearing of the pinions 4, 5 and 6 comprises eight teeth as the number best suited for facilitating the recoupling by the back pedal.

The movements of the cam-rod 15 are controlled by a resilient stop device 18 according to Figs. 5 to 7.

This device is located within a chamber inside the casing 3 corresponding to the three speeds intended, the cam-rod 15 on its portion passing this chamber being provided with three ratchet teeth 19 which are made accessible from the outside by a notch 24 made in the pedal shaft on about 120° of its circumference. In this notch an arm 20 is pivotally held by the cam-rod and a slidably arranged pawl 21 is arranged in a radial bore of said arm. This radial bore is closed by a screw plug 23 and a spring 22 inserted between said plug and the pawl keeps the latter always in mesh with the ratchet teeth 19. Arm 20 projects with its bevelled off free end to the outside of shaft 1 and strikes when the latter is rotated against the above mentioned resilient stop device 18.

This resilient stop device 18 comprises an oblong cam member which has an oblong hole and is slidingly hinged to a stationary pin 18' and in contact with a straight vertical surface of a stationary bracket 18³. This cam member is held in its extended position which is the position of rest by a spring 18². In this position the oblong side of the cam member is held by a spring 18⁵ and contrary to the buffer spring 18⁴ parallelly with said straight surface of the bracket 18³. It is slidable only in this parallel position. During the forward run (see the arrows in the Figs. 6 and 7) the arm 20 taken along by the left hand side of the notch 24 is turning with the axle 1 and so is also the pawl 21 which, engaged in a tooth 19 of the rod 15, operates a certain speed of the sprocket wheel through one of the wheels 4, 5, 6. The arm 20 passes the resilient stop device 18 and pushes it aside at each passage. No sliding movement of the cam of the resilient stop device 18 will then take place.

If the speed is to be changed the shaft 1 must be back pedalled. Then the arm 20 when coming into contact with the resilient stop device 18 will be stopped and retain also by means of pawl 21 the cam rod 15, while the shaft continues turning. This is the moment where also the cam 16 inside the pawls 10 will change position and turn for a third of a revolution until the right hand wall of notch 24 will have met with arm 20. The pawl of the next higher speed has now been brought into mesh, while the others are in an intermediate position. If the back pedalling is still continued for some time it will simply cause the pawl 21 to glide over the teeth of the cam rod and if the forward pedalling is assumed again, this pawl in the moment, when the left hand wall of the notch has come again into contact with arm 20, will fall into mesh with the next ratchet tooth. To this effect three ratchet teeth have been provided on the cam rod. This is however not absolutely necessary, less or more would also do, because the change speed has been effected already at the first displacement between shaft and cam rod and the aim is only to retake again the drive. Fig. 5 represents the position where the arm 20 has been stopped and the right hand wall of notch 24 has come into contact with arm 20 by a back pedalling. Fig. 6 represents an intermediate position when forward pedalling has been taken up again and Fig. 7 shows the position of forward pedalling.

In the Figures 8 and 9 for a two speed arrangement the cams 25 of the rod 26 have the form of blades connecting the two walls of notches 27. The holes of the bolts which are also circular, as those receiving the rod of the Figures 1 to 4, have in this case a slot-like extension 28 receiving the cam 25 to let the tooth 11 be pushed into engagement with the inner toothing of one of the gear wheels 3, 4 and 5. As shown by the Fig. 10 the rod is provided with four ratchet teeth corresponding to four turns each at 90°. While the notch 24 for the three speed change in the Figs. 5 to 7 opens to about 120°, the opening 24' of the notch for the two speed change in Fig. 10 amounts only to about 90°.

Regarding the number and position of the ratchet teeth of the cam rod 15 it must be remarked that in order to keep up a determined relative position between the eccentric pins 16 of the cam rod 15 and the ratchet teeth 19 the pitch of the latter must correspond to a number of degrees by which 360° are divisible without leaving a remainder. Therefore for a two speed change 90 and 180° will do and for a three speed change a pitch of 120°.

What I claim as new is:—

1. In a change speed device for bicycles of the kind described and in combination, a casing pressed into the framing of the bicycle, a pedal shaft and a countershaft both rotatably held within said casing, change wheels fast to the countershaft and in driving connecting with the sprocket driving pinions loose on the pedal shaft and provided with unidirectional inside teeth, and clutch members slidingly fitted into cross bores of the pedal shaft, one for each driving pinion and angularly displaced with regard to each other, and a controlling mechanism comprising, a rotatable rod axially arranged within the hollow pedal shaft with cams, one for each clutch member and provided with ratchet teeth on a portion extended to the outside of said gear arrangement, an arm having a bevelled end and pivotally held on said ratchet teeth portion inside of a recess of the pedal shaft, a resilient pawl lodged inside of said arm and located to engage said ratchet teeth and a resilient stop device pivotally held upon a pin on the casing wall and capable of meeting said arm after counter pedalling for rendering said resilient pawl effective to rotate the cams.

2. In a change speed device according to claim 1 and in combination, the resilient stop device of the controlling mechanism comprising a cam held slidingly and pivotally on a stationary pin, and a spring adapted to hold said cam in an extended position, a stationary bracket and a buffer spring attached to the same and an auxiliary spring capable to hold said cam in contact with said buffer spring.

EMIL BAUMGARTNER.